United States Patent
Eguchi

(10) Patent No.: US 11,305,788 B2
(45) Date of Patent: Apr. 19, 2022

(54) VEHICLE CONTROL APPARATUS, VEHICLE, OPERATION METHOD OF VEHICLE CONTROL APPARATUS, AND NON-TRANSITORY COMPUTER-READABLE STORAGE MEDIUM

(71) Applicant: HONDA MOTOR CO., LTD., Tokyo (JP)

(72) Inventor: Atsuhiro Eguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 55 days.

(21) Appl. No.: 16/890,067

(22) Filed: Jun. 2, 2020

(65) Prior Publication Data
US 2020/0385021 A1 Dec. 10, 2020

(30) Foreign Application Priority Data

Jun. 6, 2019 (JP) .............................. JP2019-106476

(51) Int. Cl.
*B60W 60/00* (2020.01)
*B60W 30/18* (2012.01)

(52) U.S. Cl.
CPC .. *B60W 60/0025* (2020.02); *B60W 30/18163* (2013.01); *B60W 2520/10* (2013.01); *B60W 2552/53* (2020.02)

(58) Field of Classification Search
CPC ....... B60W 30/18163; B60W 60/0025; B60W 2552/53; B60W 2520/10; B60W 30/10; B60W 30/12; B60T 8/17557; B60T 2201/08; B60T 2201/083
See application file for complete search history.

(56) References Cited

U.S. PATENT DOCUMENTS

| | | | | |
|---|---|---|---|---|
| 10,647,318 B2 * | 5/2020 | Hajika | ................... | B62D 6/003 |
| 10,661,796 B2 * | 5/2020 | Hajika | ................... | B60W 30/12 |
| 2005/0270145 A1 * | 12/2005 | Kataoka | ............... | B62D 15/025 340/435 |
| 2007/0100551 A1 * | 5/2007 | Ishikura | ............... | B62D 15/025 701/301 |
| 2008/0172153 A1 * | 7/2008 | Ozaki | ...................... | G08G 1/04 701/36 |
| 2009/0005933 A1 * | 1/2009 | Tabata | ................ | B60T 8/17557 701/42 |
| 2010/0138115 A1 * | 6/2010 | Kageyama | ........... | B62D 15/029 701/46 |

(Continued)

FOREIGN PATENT DOCUMENTS

| | | | | |
|---|---|---|---|---|
| EP | 1880912 A1 * | 1/2008 | .......... | B60T 8/17557 |
| JP | 2015003566 A * | 1/2015 | ............ | B60W 30/12 |

(Continued)

*Primary Examiner* — Angelina Shudy
(74) *Attorney, Agent, or Firm* — Thomas | Horstemeyer, LLP

(57) ABSTRACT

A vehicle control apparatus comprising: a detector configured to detect a division line of a road; a speed detector configured to detect a speed of a vehicle traveling on the road; and a controller that can execute lane departure suppression control to suppress the vehicle from departing from the division line, wherein the controller changes, in accordance with the speed detected by the speed detector, an execution timing of the lane departure suppression control with respect to the division line.

10 Claims, 6 Drawing Sheets

(56) References Cited

U.S. PATENT DOCUMENTS

| | | | | |
|---|---|---|---|---|
| 2011/0316685 A1* | 12/2011 | Kim | ..................... | B60W 30/12 |
| | | | | 340/435 |
| 2012/0109415 A1* | 5/2012 | Nitta | ................... | B62D 15/025 |
| | | | | 701/1 |
| 2012/0109461 A1* | 5/2012 | Nitta | .................. | B60W 50/045 |
| | | | | 701/41 |
| 2013/0063599 A1* | 3/2013 | Imai | .................. | G06K 9/00798 |
| | | | | 348/148 |
| 2015/0344029 A1* | 12/2015 | Silvlin | ................. | B60W 30/08 |
| | | | | 701/36 |
| 2017/0043772 A1* | 2/2017 | Watanabe | .......... | G06K 9/00798 |
| 2017/0259817 A1* | 9/2017 | Horiguchi | ....... | B60W 30/18145 |
| 2017/0287336 A1* | 10/2017 | Fu | ......................... | G08G 1/167 |
| 2018/0170424 A1* | 6/2018 | Tatsukawa | ............... | B62D 6/00 |
| 2018/0170429 A1* | 6/2018 | Shimizu | ............. | G06K 9/00805 |
| 2019/0071081 A1* | 3/2019 | Katayama | ............. | B60Q 9/008 |
| 2019/0071098 A1* | 3/2019 | Asakura | ............. | G06K 9/00798 |
| 2019/0152476 A1* | 5/2019 | Hajika | ................... | G08G 1/167 |
| 2019/0152523 A1* | 5/2019 | Hajika | .................. | B60W 30/12 |
| 2019/0283748 A1* | 9/2019 | Hajika | .................. | B60W 50/12 |
| 2021/0039638 A1* | 2/2021 | Yasui | ................. | B60W 30/095 |
| 2021/0179081 A1* | 6/2021 | Hara | ..................... | B60W 30/06 |
| 2021/0179093 A1* | 6/2021 | Miyamoto | ............ | B60W 30/09 |

FOREIGN PATENT DOCUMENTS

| | | | | |
|---|---|---|---|---|
| JP | 2018-083578 A | | 5/2018 | |
| JP | 2018083578 A | * | 5/2018 | |
| JP | 6611275 B2 | * | 11/2019 | ............ B60W 30/12 |

\* cited by examiner

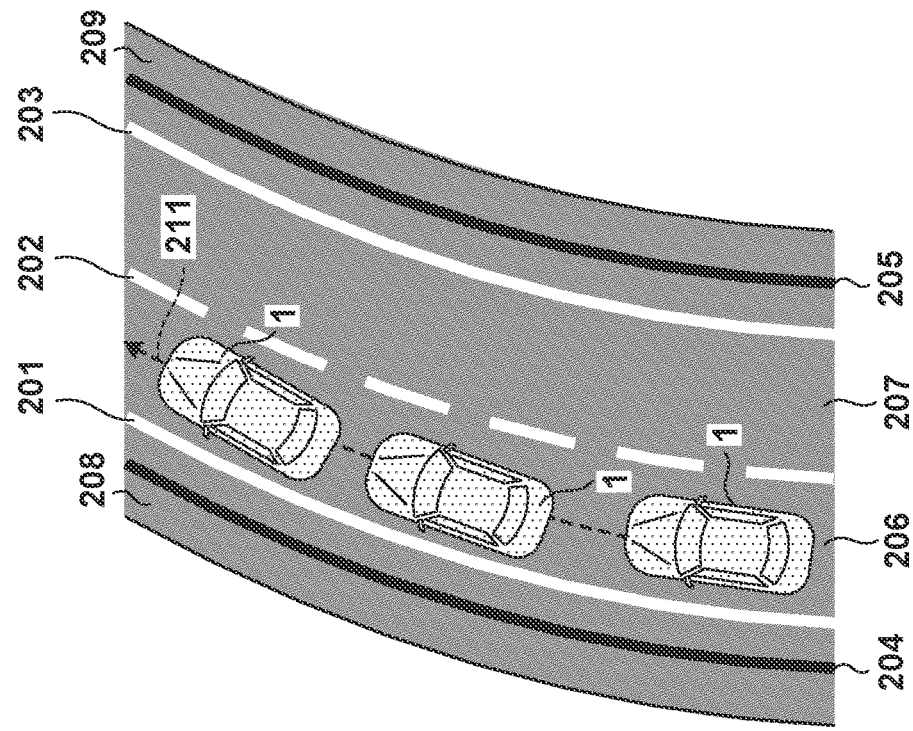
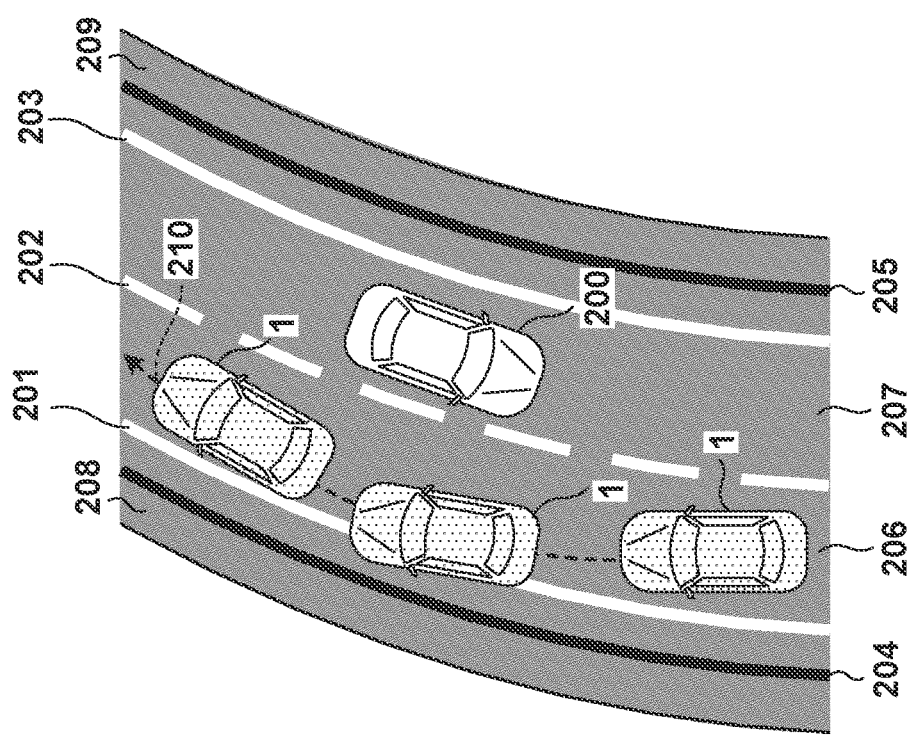

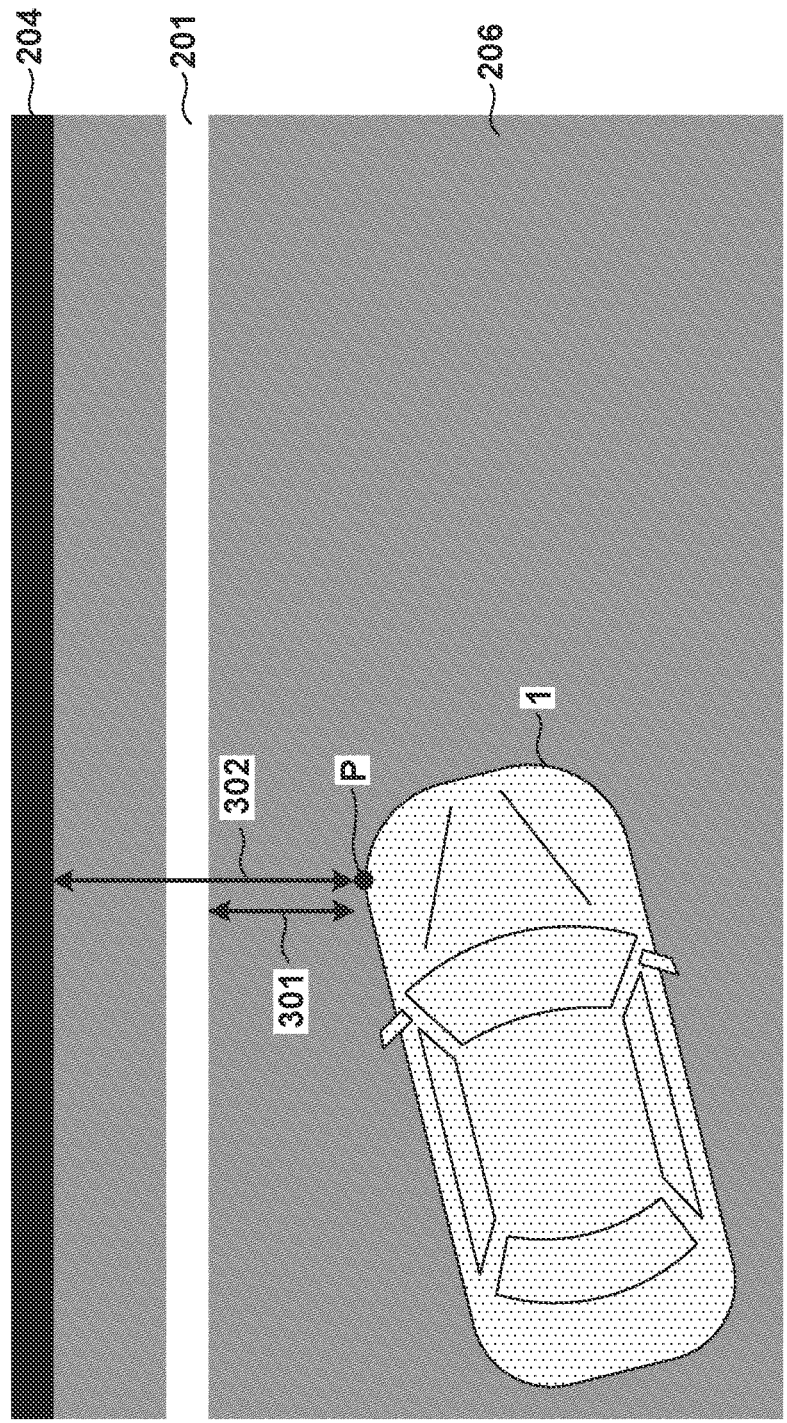

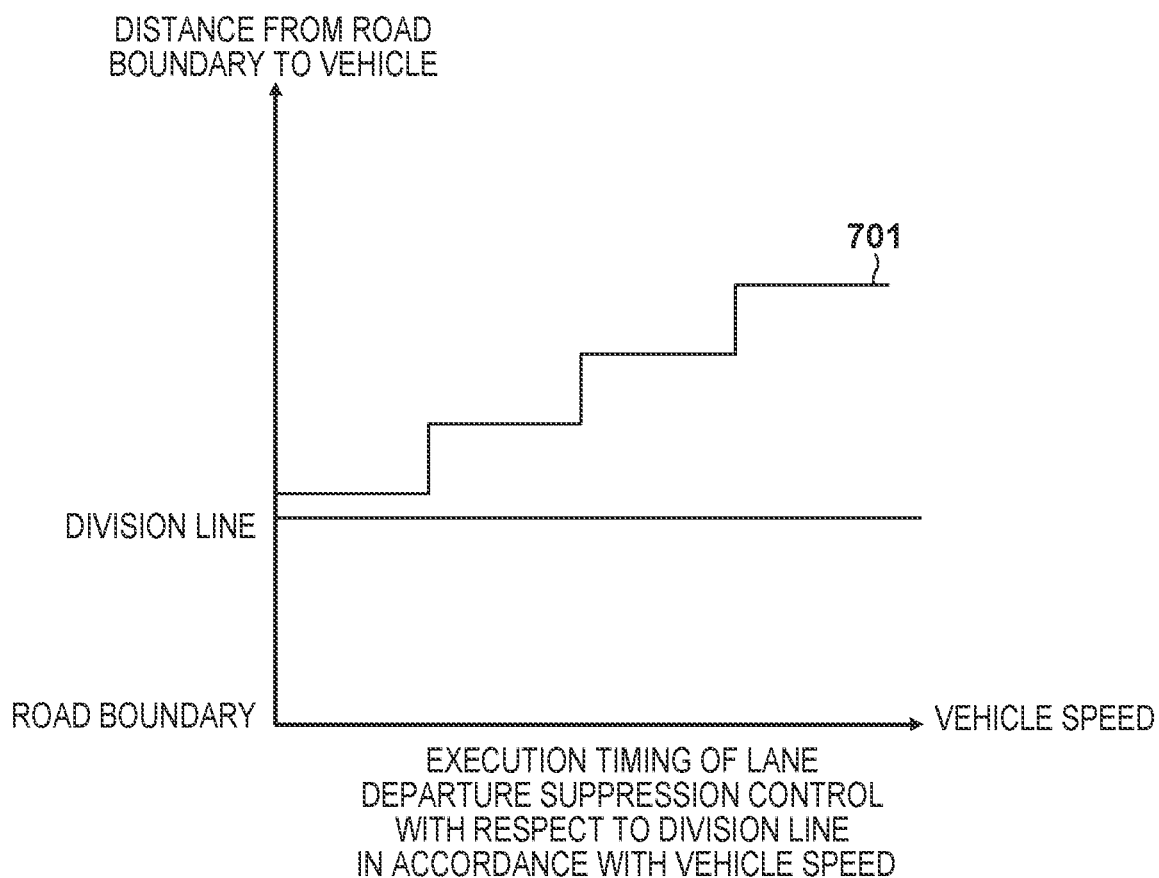

VEHICLE CONTROL APPARATUS, VEHICLE, OPERATION METHOD OF VEHICLE CONTROL APPARATUS, AND NON-TRANSITORY COMPUTER-READABLE STORAGE MEDIUM

CROSS-REFERENCE TO RELATED APPLICATION

This application claims priority to and the benefit of Japanese Patent Application No. 2019-106476 filed on Jun. 6, 2019, the entire disclosure of which is incorporated herein by reference.

BACKGROUND OF THE INVENTION

Field of the Invention

The present invention relates to a vehicle control apparatus, a vehicle, an operation method of the vehicle control apparatus, and a non-transitory computer-readable storage medium.

Description of the Related Art

Conventionally, there is known a lane departure prevention technique as an example of support for an occupant of a vehicle. Japanese Patent Laid-Open No. 2018-083578 discloses that a vehicle will be permitted to depart from a division line when a determination accuracy index is higher than a threshold, but that the vehicle will not be permitted to depart from a road boundary.

However, for example, cases in which a vehicle will travel at a low speed tend to be cases in which the vehicle is to travel a narrow road or a curve, pass an oncoming vehicle, and the like, thus requiring the vehicle be able to travel by temporarily straddling a division line. However, problematically, the technique disclosed in Japanese Patent Laid-Open No. 2018-083578 cannot implement suitable lane departure suppression control that is in correspondence with the speed of the vehicle.

The present invention provides a technique for implementing lane departure suppression control corresponding to the speed of a vehicle.

SUMMARY OF THE INVENTION

According to one aspect of the present invention, there is provided a vehicle control apparatus comprising: a detector configured to detect a division line of a road; a speed detector configured to detect a speed of a vehicle traveling on the road; and a controller that can execute lane departure suppression control to suppress the vehicle from departing from the division line, wherein the controller changes, in accordance with the speed detected by the speed detector, an execution timing of the lane departure suppression control with respect to the division line.

BRIEF DESCRIPTION OF THE DRAWINGS

The accompanying drawings, which are incorporated in and constitute a part of the specification, illustrate embodiments of the invention and, together with the description, serve to explain the invention.

FIGS. 2A and 2B are explanatory views for explaining positional relationships between division lines, road boundaries, and vehicles according to the embodiment;

FIG. 3 is an enlarged view of the periphery of a vehicle, a division line, and a road boundary;

FIG. 7 is a graph showing an example of the execution timing of lane suppression control performed with respect to the division line in correspondence with the vehicle speed according to the embodiment.

DESCRIPTION OF THE EMBODIMENTS

Figure 1:
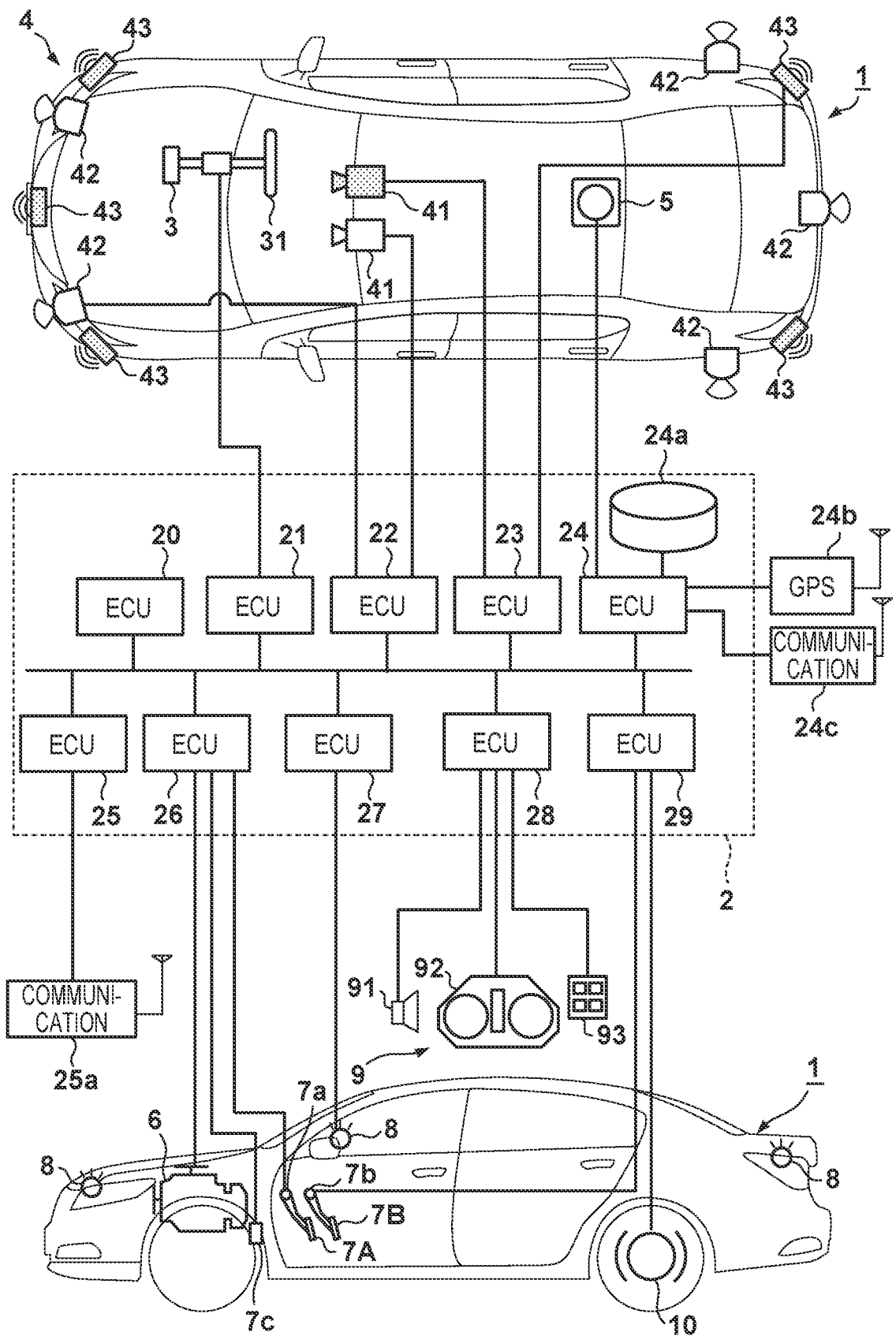
FIG. 1 is a block diagram of a vehicle control apparatus according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle.

A procedure of processing performed by an ECU 20 according to this embodiment shown in FIG. 1 will be described. The vehicle control apparatus includes a control unit (controller) 2. The control unit 2 includes a plurality of ECUs 20 to 29 communicably connected by an in-vehicle network. Each ECU includes a processor represented by a CPU (Central Processing Unit), a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed in the vehicle 1, and they can be subdivided or integrated as compared to this embodiment.

The ECU 20 executes control associated with automated driving of the vehicle 1. In automated driving, at least one of steering and acceleration/deceleration of the vehicle 1 is automatically controlled. The ECU 20 can also execute control related to driving support of the vehicle 1. Driving support includes, for example, adaptive cruise control (ACC) for reducing the driving load of a driver by executing travel by following a preceding vehicle by maintaining an appropriate following distance, and lane departure suppression control for suppress departure from a lane (division line). Automatic control of acceleration/deceleration is mainly performed in adaptive cruise control (ACC), and automatic control of the steering operation is mainly performed in lane departure suppression control.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving or driving support, the ECU 21 automatically controls the electric power steering device 3 in correspondence with an instruction from the ECU 20 and controls the direction of travel of the vehicle 1.

The ECUs 22 and 23 perform control of detection units (detector) 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the roof front of the vehicle 1. When images captured by the cameras 41 are analyzed, the contour of a target or a division line (a white line or the like) of a lane on a road can be extracted.

The detection unit 42 is Light Detection and Ranging (LIDAR) (to be sometimes referred to as the LIDAR 42 hereinafter), and detects a target around the vehicle 1 or measures the distance to a target. In this embodiment, five LIDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LIDARs, and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving or driving support, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

Control Examples

Control executed by the ECU 20 in the vehicle 1 will be described next. The ECU 20 obtains, from the ECUs 22 and 23, information related to the peripheral state (for example, the division lines of the road, the road boundaries, oncoming vehicles, targets, and the like) of the vehicle 1, and issues instructions to the ECUs 21, 26, and 29 based on the obtained information to control the steering and deceleration/acceleration of the vehicle 1. For example, the ECU 20 executes lane departure suppression control to suppress the vehicle 1 from departing from a division line or a road boundary.

FIGS. 2A and 2B are explanatory views of lane departure suppression control of the vehicle 1 according to the embodiment. FIG. 2A is a view illustrating an example in which the vehicle 1 departs from a division line while traveling, and FIG. 2B is a view illustrating an example in which the vehicle 1 travels without departing from the division line.

Reference numeral 200 denotes an oncoming vehicle. Reference numeral 201 denotes a first division line; 202, a second division line (center line); and 203, a third division line. Reference numerals 204 and 205 denote road boundaries. The road boundaries 204 and 205 may be formed by three-dimensional objects (for example, guardrails or curbstones) present above a position higher than a road. Alternatively, they may not always be three-dimensional objects, but may be boundaries at the same height as that of the road. Reference numeral 206 denotes a travel lane of the vehicle 1 defined by the first division line 201 and the second division line 202. Reference numeral 207 denotes a travel lane (oncoming lane) of the vehicle 200 defined by the second division line 202 and the third division line 203. Reference numerals 208 and 209 each denote a sidewalk.

In the example shown in FIG. 2A, the vehicle 1 is traveling along an arrow 210 in a state in which the self-vehicle is allowed to depart from the first division line 201 to the side of the road boundary 204. For example, if the oncoming vehicle 200 is present in a road which does not have a very wide road width or if the road is a road with a steep curve, the vehicle 1 tends to travel at a low speed. Hence, to make the self-vehicle avoid contact with the oncoming vehicle 200 or to allow the self-vehicle to travel smoothly, the ECU 20 will perform control to delay the execution timing of lane departure suppression control of the vehicle 1 more when the self-vehicle is traveling at a low speed than when the self-vehicle is traveling at a high speed. As a result, travel in which the self-vehicle is permitted to depart from the first division line 201 to the side of the road boundary 204 can be performed by the self-vehicle as shown in FIG. 2A.

Note that the self-vehicle need not always depart from the first division line 201 to the side of the road boundary 204 when the self-vehicle is traveling at a low speed. The self-vehicle may be set to travel in a range in which the self-vehicle will not depart from the first division line 201 as long as the execution timing of the lane departure suppression control of the vehicle 1 is delayed more than when the self-vehicle is traveling at a high speed. That is, it may be set so that the self-vehicle will travel along the center position of the travel lane 206 when the self-vehicle is traveling at high speed, and travel at a position shifted from the center position of the travel lane 206 to the side of the first division line 201 within the range of the travel lane 206 when the self-vehicle is traveling at a low speed.

On the other hand, FIG. 2B shows an example in a state in which the vehicle 1 according to the embodiment is traveling at a high speed, and the vehicle 1 is traveling without departing from the first division line 201 to the side of the road boundary 204. For example, in a road with a wide road width, the vehicle 1 tends to travel at a high speed when the oncoming vehicle 200 is not present, the road is straight, or the road has a comparably moderate curve. Hence, the ECU 20 will perform control to advance the execution timing of the lane departure suppression control of the vehicle 1 more when the self-vehicle is traveling at a high speed than when the self-vehicle is traveling at a low speed.

FIG. 3 is an enlarged view of the periphery of the vehicle 1, the first division line 201, and the road boundary 204 according to the embodiment. Reference numeral 301 denotes a distance from the first division line 201 to the vehicle 1 (a point P); and 302, a distance from the road boundary 204 to the vehicle 1 (the point P). As described above, the ECU 20 will advance the execution timing of the lane departure suppression control of the vehicle 1 when the self-vehicle is traveling at a high speed, and delay the execution timing of the lane departure suppression control of the vehicle 1 when the self-vehicle is traveling at a low speed. The execution timing of lane departure suppression control is determined based on the distance from the road boundary 204 or the first division line 201 to the vehicle 1 (the point P). Alternatively, the time at which the vehicle 1 will arrive at the road boundary 204 or the first division line 201 can be predicted, and the execution timing can be determined based on the predicted time. Note that the reference position of the vehicle 1 is not limited to the position of the point P. Another position on the vehicle 1 may be used as the reference point or a position which is apart from the vehicle 1 in the direction of travel by a predetermined distance may be used as the reference position.

Figure 4:
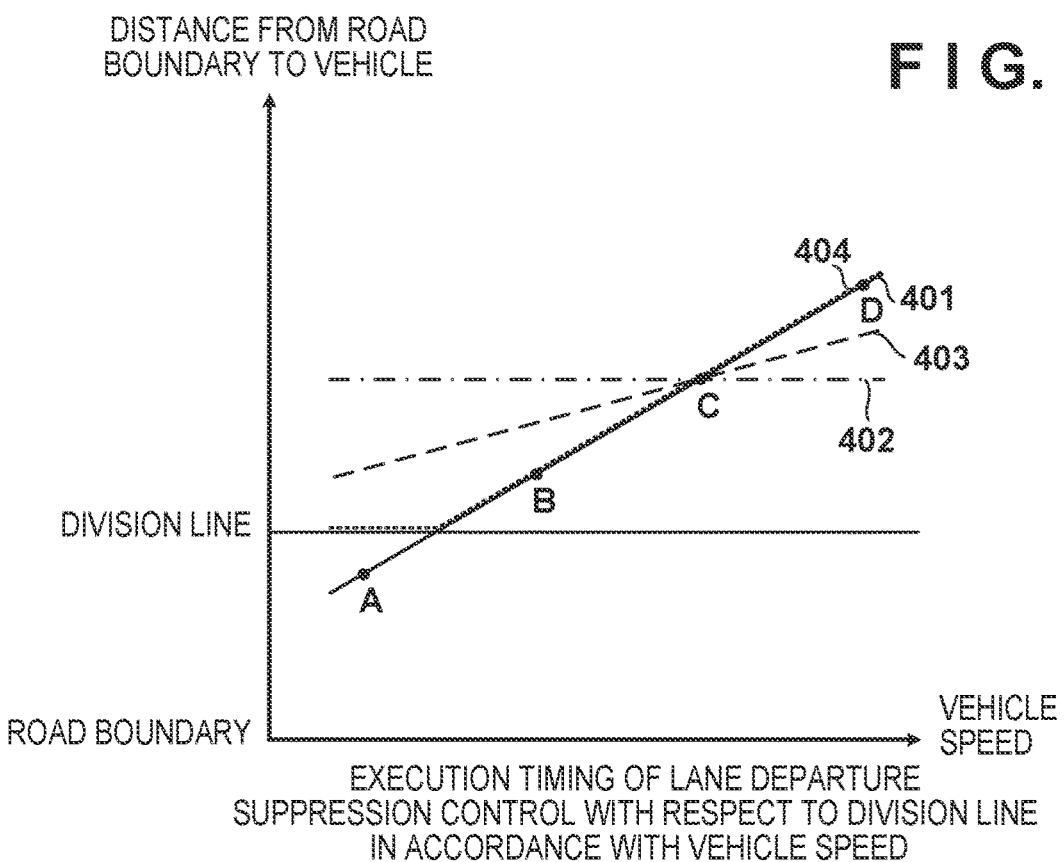
FIG. 4 is a graph showing an example of an execution timing of lane suppression control performed with respect to the division line in correspondence with a vehicle speed according to the embodiment.

Example of Execution Timing of Lane Departure Suppression Control with Respect to Division Line FIG. 4 is a graph showing an example of the execution timing of lane departure suppression control performed with respect to the division line in correspondence with the vehicle speed. The abscissa indicates the speed of the vehicle 1, and the ordinate indicates the distance from the road boundary 204 to the vehicle 1. The graph represents the distance to the vehicle 1 when the lane departure suppression control is performed with respect to the division line in correspondence with the vehicle speed.

A graph 401 shows that the lane departure suppression control is executed when the self-vehicle is traveling at a high speed (for example, a point D) even when the distance from the road boundary 204 to the vehicle 1 is long, and the execution timing is changed so the lane departure suppression control will not be executed unless the distance from the road boundary 204 to the vehicle 1 becomes shorter as the speed of the self-vehicle decreases (for example, points C and B). In addition, the graph 401 shows that, when the self-vehicle is traveling at further decreased speed (for example, a point A), the lane departure suppression control will not be executed unless the self-vehicle crosses the first division line 201 and arrives at the side of the road boundary 204.

A graph 402 shows an example in which the execution timing of the lane departure suppression control with respect to the division line is not changed in accordance with the speed of the vehicle 1 event when the self-vehicle is traveling at a high speed or low speed, and the lane departure suppression control with respect to the division line is executed at a predetermined timing.

A graph 403 shows, in a manner similar to the graph 401, that the ECU 20 will change, when the self-vehicle is traveling at a high speed, the execution timing so the lane departure suppression control is executed even if the distance from the road boundary 204 to the vehicle 1 is long, and change, as the vehicle speed decreases, the execution timing so the lane departure suppression control is not executed unless the distance from the road boundary 204 to the vehicle 1 is short. However, in contrast to the graph 401, the lane departure suppression control will be executed before the self-vehicle has crossed the first division line 201 and arrived at the road boundary 204, and the lane departure suppression control will be executed at any vehicle speed before the self-vehicle crosses the first division line 201. The slope of the graph 403 is smaller than that of the graph 401, and the change is gradual. That is, the degree of change of the execution timing of the lane departure suppression control corresponding to the speed of the vehicle 1 is suppressed more in the graph 403 than in the graph 401.

Although a graph 404 shows the same straight line as the graph 401 in a case in which the distance from the road boundary 204 to the self-vehicle is longer than that from the first division line 201 to the self-vehicle, the execution timing is not changed since the position of the first division line 201 is set as the execution timing of the lane departure suppression control when the vehicle speed is a predetermined vehicle speed or less.

In a case in which the road boundary 204 is a three-dimensional object (for example, a guardrail, a curbstone, or the like) present at a position above the height of the road, the ECU 20 may not change the execution timing of the lane departure suppression control with respect to the first division line 201 and perform control to execute the lane departure suppression control with respect to the first division line 201 at a predetermined timing (for example, the graph 402). Alternatively, the ECU 20 may perform control to suppress changes in the execution timing (for example, the graph 403). As a result, the vehicle 1 can be prevented from getting too close to the three-dimensional object such as a curbstone, a guardrail, or the like.

In a case in which the distance between the first division line 201 and the road boundary 204 is a predetermined distance or less, the ECU 20 may not change the execution timing of the lane departure suppression control with respect to the first division line 201 and may perform control to execute the lane departure suppression control with respect to the first division line 201 at a predetermined timing (for example, the graph 402). Alternatively, the ECU 20 may perform control to suppress changes in the execution timing (for example, the graph 403). Although there is a possibility that the vehicle 1 may get too close to the road boundary in a case in which the distance between the division line and the road boundary is short, this arrangement can suppress the self-vehicle from getting excessively close to the road boundary.

Figure 5:
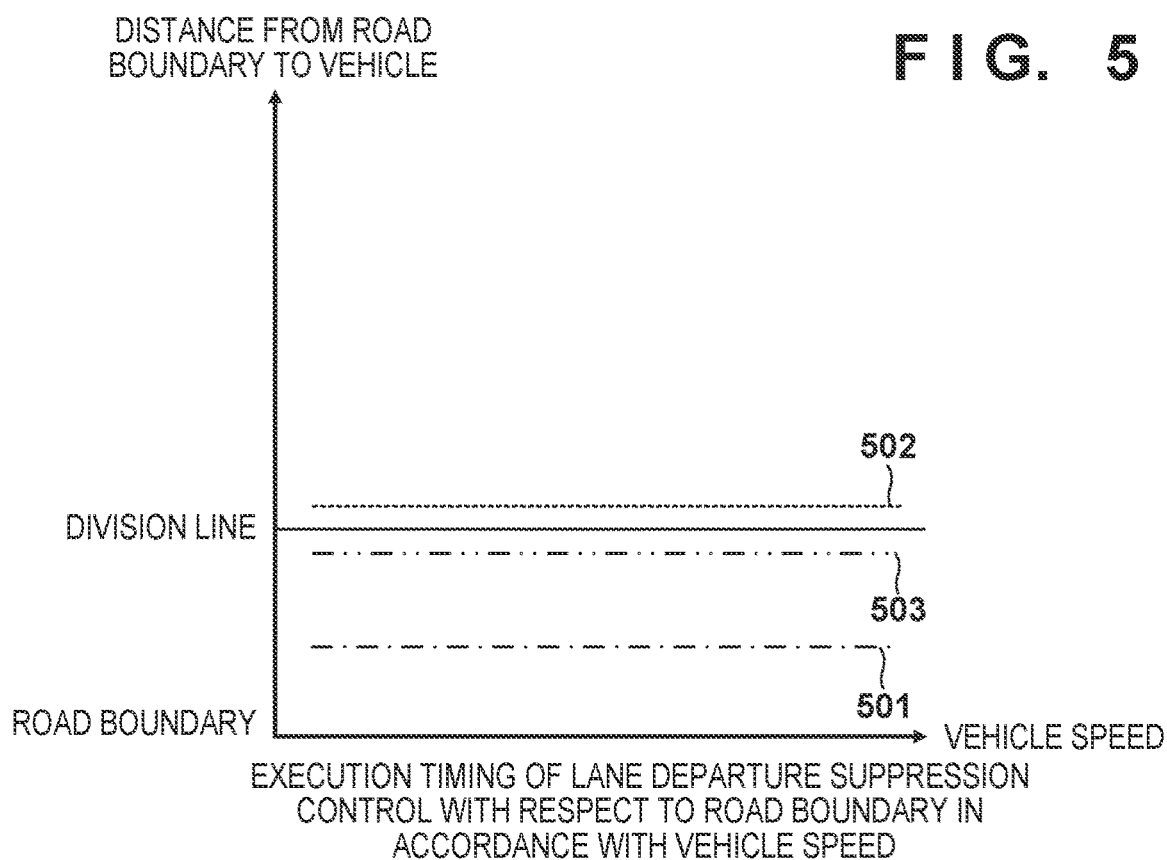
FIG. 5 is a graph showing an example of an execution timing of lane suppression control performed with respect to the road boundary in correspondence with the vehicle speed according to the embodiment.

Example of Execution Timing of Lane Departure Suppression Control with Respect to Road Boundary FIG. 5 is a graph showing an example of the execution timing of lane departure suppression control, with respect to the road boundary, executed in correspondence with the vehicle speed. The ECU 20 can also execute the lane departure suppression control with respect to the road boundary in addition to the lane departure suppression control with respect to the division line.

Each of graphs 501 to 503 is an example in which the lane departure suppression control is executed, regardless of the vehicle speed, at a timing at which a predetermined distance is reached from the road boundary (or a timing at which the time until the self-vehicle arrives at the road boundary becomes equal to a predetermined time). Although the degree of driving freedom of the driver is prioritized by preventing excessive execution of the lane departure suppression control in the case of the division line, it is necessary to prevent the vehicle from crossing the road boundary and departing to a sidewalk or the like. Hence, the lane departure suppression control with respect to the road boundary needs to be executed at the same execution timing regardless of the vehicle speed.

For example, control may be performed so that the execution timing of the lane departure suppression control with respect to the division line will be set in accordance with the graph 401 of FIG. 4, and the execution of timing of the lane departure suppression control with respect to the road boundary will be set in accordance with the graph 501 of FIG. 5. Alternatively, control may be performed so that the execution timing of the lane departure suppression control with respect to the division line will be set in accordance with the graph 403 or 404 of FIG. 4, and the execution of timing of the lane departure suppression control with respect to the road boundary will be set in accordance with the graph 502 or 503 of FIG. 5. Note that any kind of combination may be set as long as control with respect to the division line is performed before the control with respect to the road boundary.

In this manner, by executing the lane departure suppression control with respect to the road boundary at the same execution timing regardless of the vehicle speed, the self-vehicle can be prevented from getting too close the road boundary.

In addition, in a case in which the speed of the vehicle 1 is a predetermined speed or less (for example, is at an extremely low speed), the ECU 20 may perform control to execute the lane departure suppression control with respect to the road boundary 204, but not execute the lane departure suppression control with respect to the first division line 201. As a result, it is possible to prevent the lane departure suppression control with respect to the division line from being performed at a timing unintended by an occupant, and prevent the self-vehicle from getting too close to the road boundary.

Processing

Figure 6:
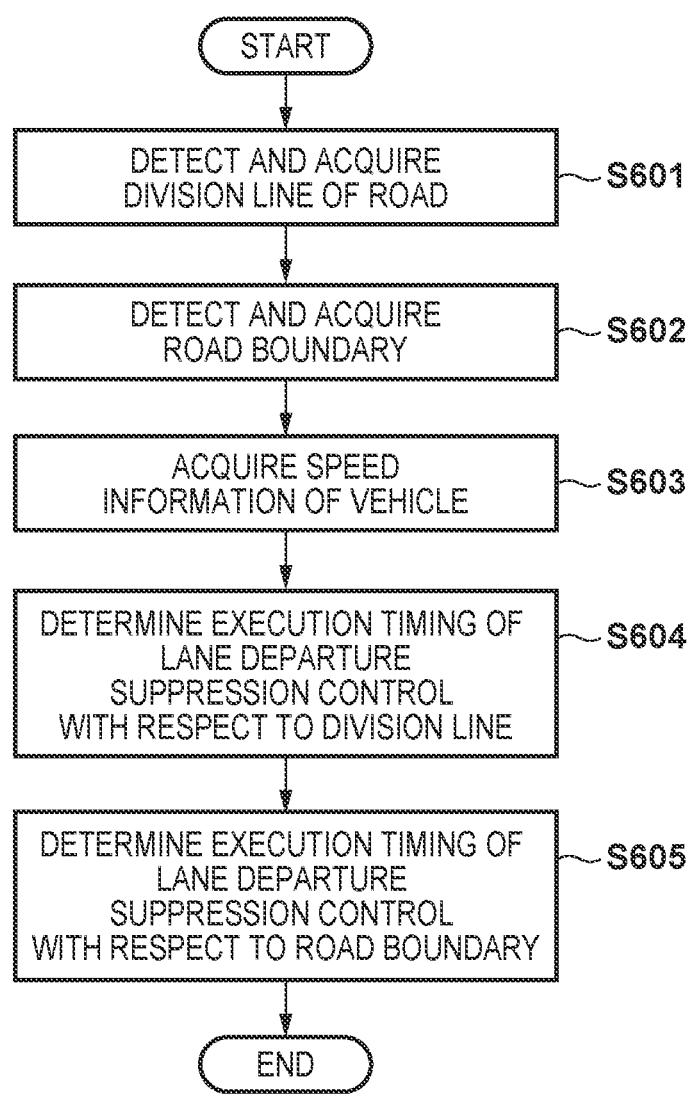
FIG. 6 is a flowchart showing the procedure of processing executed by the vehicle control apparatus according to the embodiment.

The procedure of processing executed by the vehicle control apparatus according to the embodiment will be described next with reference to the flowchart of FIG. 6.

In step S601, the ECU 20 detects a division line of a road based on information related to the peripheral state of the vehicle 1 obtained from the ECUs 22 and 23. In step S602, the ECU 20 detects a road boundary based on the information related to the peripheral state of the vehicle 1 obtained from the ECUs 22 and 23. In step S603, the ECU 20 obtains, from the ECU 26, the vehicle speed information of the vehicle 1 detected by the vehicle speed sensor 7*c*.

In step S604, the ECU 20 determines the execution timing of the lane departure suppression control performed to suppress the departure of the self-vehicle from the detected division line. More specifically, the ECU 20 will change the execution timing of the lane departure suppression control with respect to the division line in accordance with the detected vehicle speed. For example, as shown in the graph 401 of FIG. 4, control will be performed so that the lane departure suppression control is executed at an execution timing corresponding to the detected speed of the vehicle 1.

In step S605, the ECU 20 determines the execution timing of the lane departure suppression control for suppressing the self-vehicle from departing from the detected road boundary. More specifically, the ECU 20 will perform control to execute, regardless of the detected speed of the vehicle 1, the lane departure suppression control with respect to the road boundary at the same timing. For example, as shown in the graph 501 of FIG. 5, control will be performed so that lane departure suppression control with respect to the road boundary is executed at the same timing regardless of the detected speed of the vehicle 1. The series of processes of FIG. 6 has been described above.

As a result, it is possible to implement suitable lane departure suppression control corresponding to the speed of the vehicle. Note that as described above with reference to FIGS. 4 and 5, the processes of steps S604 and S605 are not limited to control operations performed in accordance with the graph 401 of FIG. 4 and the graph 501 of FIG. 5. Various kinds of combinations of graphs can be used as long as control with respect to the division line is executed before the control executed with respect to the road boundary. In addition, the present invention is not limited to the examples of the illustrated graphs. For example, instead of continuously changing the execution timing of the lane departure suppression control for suppressing the departure of the self-vehicle from the division line, it may be set so that the execution timing will be changed step by step in accordance with the speed range of the vehicle 1 as shown in a graph 701 of FIG. 7.

As described above, in this embodiment, the execution timing of the lane departure suppression control with respect to the division line is changed in accordance with the speed of the vehicle. As a result, suitable lane departure suppression control corresponding to the speed of the vehicle can be implemented.

[Modification]

Note that although the above-described embodiment has described an example in which the execution timing of the lane departure suppression control with respect to the division line is changed in accordance with the speed of the vehicle, the road width, the presence/absence of an oncoming vehicle, the curvature of a curve, and the like may also be considered in addition to the speed of the vehicle. For example, it may be set so that the lane departure suppression control corresponding to the speed of the vehicle will be executed when the road width is a predetermined value or less. Also, it may be set so that the lane departure suppression control corresponding to the speed of the vehicle will be executed when an oncoming vehicle is detected. Furthermore, it may be set so that the lane departure suppression control corresponding to the speed of the vehicle will be executed when the curvature of a curve is a predetermined value or more. Alternatively, some of these conditions may be combined and set so that the lane departure suppression control corresponding to the speed of the vehicle will be executed when a plurality of conditions are satisfied.

As a result, suitable control that reflects the occupant's intention to travel by temporarily exceeding the division line can be executed when the vehicle is to travel a narrow road or a road with a steep curve in which the self-vehicle is expected to travel at a low speed, when the vehicle is to pass another vehicle, and the like.

According to this embodiment, suitable lane departure suppression control corresponding to the speed of the vehicle can be implemented.

Other Embodiments

A program for implementing each function of one or more driving support apparatuses described in the embodiments is supplied to a system or apparatus via a network or storage medium, and one or more processors in the computer of the system or apparatus can read out and execute the program. This form can also implement the present invention.

Summary of Embodiment

1. A vehicle control apparatus according to the above-described embodiment is a vehicle control apparatus (for example, 2) comprising:

a detector (for example, 21, 22, 23, 41, 42, 43) configured to detect a division line (for example, 201) of a road;

a speed detector (for example, 21, 26, 7c) configured to detect a speed of a vehicle traveling on the road; and a controller (for example, 20) that can execute lane departure suppression control to suppress the vehicle from departing from the division line, wherein the controller changes, in accordance with the speed detected by the speed detector, an execution timing of the lane departure suppression control with respect to the division line.

According to this embodiment, suitable lane departure suppression control corresponding to the speed of the vehicle can be implemented. Hence, lane departure suppression control can be implemented according to the intention of the occupant.

2. In the vehicle control apparatus according to the above-described embodiment, the controller increasingly delays the execution timing of the lane departure suppression control with respect to the division line as the speed of the vehicle decreases, and increasingly advances the execution timing of the lane departure suppression control with respect to the division line as the speed of the vehicle increases (for example, 401).

According to this embodiment, the self-vehicle can travel close to the division line or over the division line while traveling at a low speed. Hence, for example, lane departure suppression control can be implemented according to the intention of the occupant in a case in which the self-vehicle is to travel a road with a narrow road width, travel a steep curve, or pass an oncoming car.

3. In the vehicle control apparatus according to the above-described embodiment, the detector further detects a road boundary (for example, 204), and in a case in which the road boundary is a three-dimensional object (for example, a guardrail or a curbstone) present at a position above the height of the road, the controller will perform one of an operation to execute, without changing the execution timing of the lane departure suppression control with respect to the division line in correspondence with the speed, the lane departure suppression control with respect to the division line at a predetermined timing (for example, 402), and an operation to suppress the degree of change of the execution timing performed in correspondence with the speed (for example, 403).

According to this embodiment, it is possible to prevent the vehicle from getting to close to a three-dimensional object such as a guardrail, a curbstone, or the like.

4. In the vehicle control apparatus according to the above-described embodiment, the detector further detects a road boundary, and in a case in which a distance between the division line and the road boundary is not more than a predetermined distance, the controller will perform one of an operation to execute, without changing the execution timing of the lane departure suppression control with respect to the division line in correspondence with the speed, the lane departure suppression control with respect to the division line at a predetermined timing, and an operation to suppress the degree of change of the execution timing performed in correspondence with the speed.

According to this embodiment, it is possible to suppress the vehicle from getting excessively close to the road boundary.

5. In the vehicle control apparatus according to the above-described embodiment, the controller can further execute lane departure suppression control to suppress the vehicle from departing from a road boundary (for example, 204), and the controller performs control to execute, without changing the execution timing of the lane departure suppression control with respect to the road boundary, the lane departure suppression control with respect to the road boundary at a predetermined timing (for example, 501).

According to this embodiment, since the lane departure suppression control with respect to the road boundary is executed at a predetermined timing regardless of the speed of the vehicle, it is possible to prevent the self-vehicle from getting too close to the road boundary.

6. In the vehicle control apparatus according to the above-described embodiment, the controller can further execute lane departure suppression control to suppress the vehicle from departing from a road boundary (for example, 204), and in a case in which the speed is not more than a predetermined speed, the controller executes the lane departure suppression control with respect to the road boundary, and does not execute the lane departure suppression control with respect to the division line.

According to this embodiment, since only the lane departure suppression control with respect to the road boundary is executed when, for example, the self-vehicle is traveling at an extremely low speed, the possibility that the lane departure suppression will be executed at a timing unintended by the occupant can be reduced. In addition, it is possible to prevent the self-vehicle from getting to close to the road boundary.

7. In the vehicle control apparatus according to the above-described embodiment, the controller determines, based on a distance (for example, 301) between the vehicle and the division line, the execution timing of the lane departure suppression control with respect to the division line.

According to this embodiment, the execution timing of the lane departure suppression control can be determined based on the distance.

8. In the vehicle control apparatus according to the above-described embodiment, the controller predicts a time until the vehicle arrives at the division line and determines, based on the predicted time, the execution timing of the lane departure suppression control with respect to the division line.

According to this embodiment, the execution timing of the lane departure suppression control can be determined based on the predicted time until the vehicle arrives at the division line.

9. A vehicle (for example, 1) according to the above-described embodiment is a vehicle comprising a vehicle control apparatus according to the above-described embodiment.

According to this embodiment, the processing executed by the vehicle control apparatus can be implemented in a vehicle.

10. An operation method of a vehicle control apparatus according to the above-described embodiment is an operation method of a vehicle control apparatus, the method comprising:

detecting (S601) a division line (for example, 201) of a road;

detecting (S603) a speed of a vehicle traveling on the road; and executing (S604) lane departure suppression control to suppress the vehicle from departing from the division line, wherein in the executing, an execution timing of the lane departure suppression control with respect to the division line is changed in accordance with the detected speed.

According to this embodiment, suitable lane departure suppression control corresponding to the speed of the vehicle can be implemented. Hence, lane departure suppression control can be implemented according to the intention of the occupant.

11. A program according to the above-described embodiment is a program for causing a computer to function as a vehicle control apparatus according to the above-described embodiment.

According to this embodiment, the contents of the present invention can be implemented by a computer.

The invention is not limited to the foregoing embodiments, and various variations/changes are possible within the spirit of the invention.

What is claimed is:

1. A vehicle control apparatus comprising:
a camera configured to detect a division line of a road;
a vehicle speed sensor configured to detect a speed of a vehicle traveling on the road; and
a controller that can execute lane departure suppression control to suppress the vehicle from departing from the division line,
wherein the controller changes, in accordance with the speed detected by the vehicle speed sensor, an execution timing of the lane departure suppression control with respect to the division line,
wherein the controller increases a delay of the execution timing of the lane departure suppression control with respect to the division line in response to a decrease in the speed of the vehicle, and
advances the execution timing of the lane departure suppression control with respect to the division line in response to an increase of the speed of the vehicle,
wherein the execution timing is not changed since a position of the division line is set as the execution timing of the lane departure suppression control when the speed of the vehicle is a predetermined vehicle speed or less.

2. The apparatus according to claim 1, wherein the camera further detects a road boundary, and
in a case in which the road boundary is a three-dimensional object present at a position above a height of the road, the controller will perform one of
an operation to execute, without changing the execution timing of the lane departure suppression control with respect to the division line in correspondence with the speed, the lane departure suppression control with respect to the division line at a predetermined timing, and
an operation to suppress a degree of change of the execution timing performed in correspondence with the speed.

3. The apparatus according to claim 1, wherein the further detects a road boundary, and in a case in which a distance between the division line and the road boundary is not more than a predetermined distance, the controller will perform one of an operation to execute, without changing the execution timing of the lane departure suppression control with respect to the division line in correspondence with the speed, the lane departure suppression control with respect to the division line at a predetermined timing, and an operation to suppress a degree of change of the execution timing performed in correspondence with the speed.

4. The apparatus according to claim 1, wherein the controller can further execute lane departure suppression control to suppress the vehicle from departing from a road boundary, and the controller performs control to execute, without changing the execution timing of the lane departure suppression control with respect to the road boundary, the lane departure suppression control with respect to the road boundary at a predetermined timing.

5. The apparatus according to claim 1, wherein the controller can further execute lane departure suppression control to suppress the vehicle from departing from a road boundary, and in a case in which the speed is not more than a predetermined speed, the controller executes the lane departure suppression control with respect to the road boundary, and does not execute the lane departure suppression control with respect to the division line.

6. The apparatus according to claim 1, wherein the controller determines, based on a distance between the vehicle and the division line, the execution timing of the lane departure suppression control with respect to the division line.

7. The apparatus according to claim 1, wherein the controller predicts a time until the vehicle arrives at the division line and determines, based on the predicted time, the execution timing of the lane departure suppression control with respect to the division line.

8. A vehicle comprising a vehicle control apparatus defined in claim 1.

9. An operation method of a vehicle control apparatus, the method comprising:

detecting a division line of a road;

detecting a speed of a vehicle traveling on the road; and executing lane departure suppression control to suppress the vehicle from departing from the division line, wherein in the executing, an execution timing of the lane departure suppression control with respect to the division line is changed in accordance with the detected speed, wherein a delay of the execution timing of the lane departure suppression control is increased with respect to the divisional line in response to a decrease in the speed of the vehicle, and the execution timing of the lane departure suppression control is advanced with respect to the division line in response to an increase of the speed of the vehicle, wherein the execution timing is not changed since a position of the division line is set as the execution timing of the lane departure suppression control when the speed of the vehicle is a predetermined vehicle speed or less.

10. A non-transitory computer-readable storage medium storing a program for causing a computer to execute an operation method of a vehicle control apparatus, the method comprising:

detecting a division line of a road;

detecting a speed of a vehicle traveling on the road; and executing lane departure suppression control to suppress the vehicle from departing from the division line, wherein in the executing, an execution timing of the lane departure suppression control with respect to the division line is changed in accordance with the detected speed, wherein a delay of the execution timing of the lane departure suppression control is increased with respect to the divisional line in response to a decrease in the speed of the vehicle, and the execution timing of the lane departure suppression control is advanced with respect to the division line in response to an increase of the speed of the vehicle, wherein the execution timing is not changed since a position of the division line is set as the execution timing of the lane departure suppression control when the speed of the vehicle is a predetermined vehicle speed or less.

* * * * *